UNITED STATES PATENT OFFICE 2,528,769

REACTION PRODUCT OF HALOALKYLTHIO-PHENES AND HYDROXYARYL COMPOUNDS

John H. McCracken, Corpus Christi, Tex., assignor to Socony-Vacuum Oil Company, Incorporated, a corporation of New York No Drawing. Application May 28, 1947, Serial No. 751,123

12 Claims. (Cl. 252—48.2)

This invention relates to a new group of compositions of matter formed by the interaction of haloalkylthiophenes and hydroxyaryl compounds and to mineral oil compositions containing these new materials.

Haloalkylthiophenes such, for example, as chloromethylthiophene are known and may be prepared according to the procedure outlined by Blicke and Burckhalter in the Journal of the American Chemical Society, volume 64, page 477 (1942). The corresponding ethyl, propyl and butyl compounds may also be prepared, and the thiophene may be additionally substituted, either before or after converting it into the haloalkyl derivative, by other radicals, if so desired.

In accordance with the present invention, it has been discovered that haloalkylthiophenes, either with or without additional substituents in the thiophene ring, may be reacted with hydroxyaryl compounds, such as phenols and naphthols, either substituted or unsubstituted, to form new compositions of matter, which are apparently thienylalkyl aryl hydroxy compounds. These may either be substituted by reason of substituents in the original thiophene or aryl nuclei, or may have substituents inserted after their formation.

It has further been discovered that the new compounds, when incorporated in minor amounts in oil compositions, stabilize the oil against discoloration and oxidation.

The following examples illustrate the general principles of this invention, but it is to be understood that they represent but a few possible examples of the numerous new compositions of matter that may be prepared and utilized in accordance with the general principles of this invention.

Example I

In a 3-necked flask fitted with a mechanical stirrer and dropping funnel, were placed 200 cc. of benzene and 38 g. (0.405 mol) of phenol. The solution was cooled in an ice bath and a solution of 18 g. (0.135 mol) of chloromethylthiophene (prepared by the procedure outlined by Blicke and Burckhalter in Journal of American Chemical Society, vol. 64, page 477 (1942), except that the procedure was simplified by using liquid hydrochloric acid (instead of gaseous hydrochloric acid) dissolved in 25 cc. of benzene) was added dropwise over 1½ hours' time. Hydrogen chloride was evolved in copious amounts.

After standing at room temperature for several hours, the benzene solution was washed first with water, then with sodium bicarbonate solution and then twice again with water to remove the hydrochloric acid. The benzene and excess phenol were removed by distillation at reduced pressure and the yield of unpurified material proved to be about 85% based on the amount of chloromethylthiophene used.

Purification was effected by dissolving the product in benzene, decolorizing with an adsorptive clay and crystallizing from a benzene-petroleum ether mixture. The purified material was a white, crystalline solid, melting at 59–60° C. On treatment with chloracetic acid in alkaline solution, this material yielded a compound which was apparently p-(2-thenyl) phenoxyacetic acid, melting at 108.5–109.5° C. The theoretical neutralization number (milligrams of KOH required to neutralize the acids in one gram of product) for this acid is 248. Experimentally, it was determined to be 249.7. It was therefore assumed that the new composition of matter formed by this example was actually a new chemical compound, p-(2-thenyl)phenol:

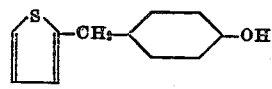

Example II

Isobutylene was bubbled into a solution of p-(2-thenyl)phenol (prepared in accordance with Example I) and 5% by weight of concentrated sulphuric acid, in chloroform. This was continued until the reaction temperature dropped slightly. After washing and distilling off the solvent, the product was distilled and a fraction boiling at 165–180° C. at 4 mm. of mercury pressure was collected. This product was washed with caustic to remove any unreacted starting material and the result was a mobile, yellow oil. This product is believed to have the following structural formula:

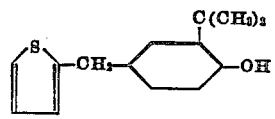

The calculated sulphur content for a compound of the above structural formula should be 13.0%. Analysis showed the new product to contain 13.18% sulphur.

Example III

Starting with p(2-thenyl)phenol, 5% by weight of concentrated sulphuric acid was added, and another 5% by weight of a 5% solution of boric acid was also added. This mixture was diluted with about 25% by weight of benzene and isobutylene was passed slowly into the mixture at a temperature of about 70° C. After ½ hour, another 25% of benzene was added and the passing of isobutylene into the mixture continued for about 2 additional hours. The acid was then removed by washing the product with a sodium bicarbonate solution and the solvent was removed by distillation. The residue was vacuum distilled and the fraction boiling at 180° to 210° C. at 3 mm. of mercury pressure was collected as the product. It was a mobile yellow oil which darkened on exposure to air. The formula should be:

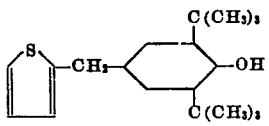

The calculated sulphur content should be 10.6% and upon analysis it was found to be 11.52%.

*Example IV*

In a 3-necked flask fitted with a mechanical stirrer and dropping funnel, t-butylthiophene was chlormethylated by adding an equimolecular proportion of aqueous formaldehyde to a starting mixture of t-butylthiophene in concentrated hydrochloric acid. The resultant compound 5-t-butyl-2-chlormethylthiophene is a colorless liquid boiling at 86–98° C. at 3 mm. of mercury pressure.

Solutions of 3.5 g. (0.019 mol) of the above product and 6 g. (0.064 mol) of phenol in chloroform were mixed and heated to reflux temperature for 0.5 hour. The product was washed and the solvent removed as before. The residue was distilled under reduced pressure and the fraction boiling at 163–170° C. at 2 mm. of mercury pressure was collected as a product. This product is believed to be:

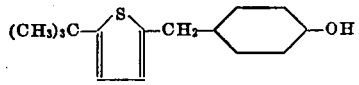

*Example V*

To a solution of 26 g. (0.18 mol) of alpha-naphthol in 150 cc. of chloroform contained in an Erlenmeyer flask was added a solution of 12 g. (0.09 mol) of chlormethylthiophene in 25 cc. of chloroform. The solution was refluxed for 1 hour. After washing and removing the solvent by distillation, most of the excess alpha-naphthol was distilled off by heating the flask to 150° C. under 2 mm. of mercury pressure. The residue was crystallized from a cyclohexane-benzene mixture after treating with an adsorptive clay. Two recrystallizations from cyclohexane containing a little alcohol yielded tan, sandy crystals melting at 136.5–138° C. This is apparently:

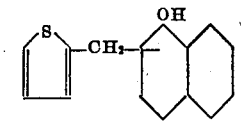

By calculation it should have a sulphur content of 13.3%. It was actually found by analysis to have a sulphur content of 13.2%.

*Example VI*

A reaction between chlormethylthiophene and beta-naphthol was carried out in the same manner as the reaction with alpha-naphthol in Example V. After removing the solvent and most of the excess beta-naphthol, the product was purified by fractional extraction with cyclohexane, the product being more soluble than the unreacted beta-naphthol. The product is a clear oil which becomes partially solid on standing at room temperature. The product is apparently:

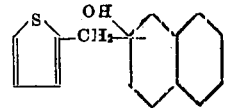

The calculated sulphur content again is 13.3%. By analysis it was found to be 10.42%.

*Example VII*

In an effort to produce additional new compounds and in addition to definitely fix the formula of the compound produced by Example III, p-(5-t-butyl-2-thenyl)phenol was alkylated by the procedure outlined in Example II, which should be a product of the following structure:

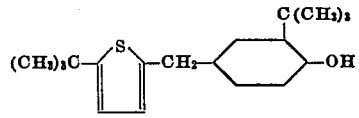

This product had a boiling point of 185–193° C. at 3 mm. of mercury pressure and a refractive index ($n_D^{25}$) of 1.5494 as compared to a refractive index of 1.5474 for the product of Example III.

*Example VIII*

By reacting 5-t-butyl-2-chlormethylthiophene with 2-butyl phenol in the manner described in Example IV, a product was produced which was substantially identical with the product of Example VII, having a boiling point of 180–195° C. at 3 mm. of mercury pressure and an index of refraction of 1.5494.

The efficacy of the above materials in improving the characteristics of mineral oil may be seen from the following examples. In some of these examples, a compound was used which is believed to be 2,4 bis (2-thenyl) phenol. This compound was recovered from the residue of the reactions of chlormethylthiophene with phenol in Example I. It is a yellow liquid, which darkens on standing, boils at 195–210° C. at 2 mm. of mercury pressure. On analysis, it shows 21.47% sulphur, whereas theoretically it should contain 22.38% sulphur. The oils used in the following examples were:

| Oil | S. U. V. at 100° F. | Flash Point, °F. | Specific Gravity |
| --- | --- | --- | --- |
| A | 69 | 310 | 0.871 |
| B | 150 | 420 | 0.856 |
| C | 150 | 385 | 0.879 |

*Example IX*

A number of tests have been made on blends of the products of the above examples with a highly refined oil suitable for use in transformers. In the following table this oil is designated as "Oil A." This oil was prepared by treating a Coastal distillate with 40 pounds of 98% sulphuric acid and 180 pounds of 103% oleum per barrel. This was followed by washing and percolating through clay. This type of oil tends to form acidic products on oxidation. It was tested by heating samples to 120° C. and bubbling oxygen through them for 70 hours. The oxidation was then determined by titrating with an alcoholic solution of potassium hydroxide. The data obtained for the oil alone and for the oil blends containing typical reaction products contemplated herein are set forth in the following table in terms of Neutralization Numbers which represent milligrams of potassium hydroxide required to neutralize the acids formed in a gram of oil

| Composition: | Neutralization No. |
|---|---|
| Oil A only | 18.5 |
| Oil A+0.2% 2-t-butyl-4-(2-thenyl) phenol | 2.5 |
| Oil A+0.2% 2,6-di-t-butyl-4-(2-thenyl) phenol | 0.01 |
| Oil A+0.2% p-(5-butyl-2-thenyl) phenol | 0.05 |
| Oil A+0.2% (2-thenyl)-alpha-naphthol | 0.05 |
| Oil A+0.2% (2-thenyl)-beta-naphthol | 0.05 |
| Oil A+0.2% 2-t-butyl-4-(5-t-butyl-2-thenyl) phenol prepared in accordance with Example VIII | 0.02 |
| Oil A+0.2% 2-t-butyl-4-(5-t-butyl-2-thenyl) phenol prepared in accordance with Example IX | 0.02 |
| Oil A+0.2% 2,4-bis (2-thenyl) phenol | 0.06 |

Example X

A number of tests have also been made on blends of the products of the above examples with a distillate from a Rodessa crude which was refined with furfural, dewaxed and filtered. This oil is designated "Oil B." It is an oil suitable for use in steam turbines. This oil was tested by the Brown-Boveri turbine test method which involves heating a test sample of the oil in the presence of a piece of copper foil, at a temperature of 110° C. in air, and for 72 hours. At the end of the test, the color and Neutralization Number of the sample are determined and these are indicative of the extent to which the oil is affected by oxidation. The following results were obtained:

| Composition | Color Lovibond | Neutralization Number |
|---|---|---|
| Oil B | 27 | 0.3 |
| Oil B+0.2% p-(2-thenyl) phenol | 3 | 0.03 |
| Oil B+0.2% 2-t-butyl-4-(2-thenyl)phenol | 15 | 0.15 |
| Oil B+0.2% 2,6-di-t-butyl-4-(2-thenyl) phenol | 32 | 0.03 |
| Oil B+0.2% p-(5-t-butyl-2-thenyl) phenol | 25 | 0.12 |
| Oil B+0.2% (2-thenyl)-alpha-naphthol | 100 | 0.02 |
| Oil B+0.2% (2-thenyl)-beta-naphthol | 4 | 0.05 |
| Oil B+0.2% 2-t-butyl-4-(5-t-butyl-2-thenyl)phenol prepared in accordance with Example VIII | 14 | 0.02 |
| Oil B+0.2% 2-t-butyl-4-(5-t-butyl-2-thenyl)phenol prepared in accordance with Example IX | 32 | 0.02 |
| Oil B+0.2% 2,4-bis(2-thenyl)phenol | 2 | 0.04 |

Example XI

A number of tests have also been made on blends of the product of the above examples with a mixed Mid-Continent and Coastal distillate which has been refined by treatment with 70 pounds of 98% sulphuric acid per barrel. This oil is designated "Oil C." The treated oil is then neutralized, washed and filtered through clay. Oil C and Oil B were tested in accordance with the following test: The test consists in placing 25 ml. of oil to be tested in each of four 150 x 25 mm. test tubes, each covered with a glass lid and provided with a 5 mm. delivery tube extending to the bottom. Nine iron nails (1.0±0.1 g.) and a copper coil (24 in. of No. 8 wire) are also placed in each tube. During the test the temperature is maintained at 91° C. and clean, dry air is bubbled through the oil at 5 liters per hour. Also 2 ml. of distilled water are added once every 24 hours. Samples are removed from the test bath after varying periods of time and examined for acidity (neutralization number) and color. The following results were obtained:

| Composition | Hours | Color Lovibond | Neutralization Number |
|---|---|---|---|
| Oil B | 166 | 50 | 8.3 |
| Oil B+0.2% p-(2-thenyl) phenol | 162 | 1.5 | 0.02 |
|  | 308 | 5 | 0.02 |
|  | 886 | 32 | 3.7 |
| Oil B+0.2% 2-t-butyl-4-(2-thenyl) phenol | 190 | 5 | 0.04 |
|  | 262 | 6 | 2.1 |
| Oil B+0.2% 2,6-di-t-butyl-4-(2-thenyl) phenol | 144 | 7 | 0.04 |
|  | 358 | 10 | 0.04 |
|  | 1,440 | 11 | 3.2 |
| Oil B+0.2% p-(5-t-butyl-2-thenyl) phenol | 162 | 9 | 0.04 |
|  | 720 | 15 | 1.4 |
| Oil B+0.2% (2-thenyl)-alpha napthol | 167 | 22 | 0.12 |
| Oil B+0.2% (2-thenyl)-beta-naphthol | 188 | 15 | 0.02 |
|  | 572 | 15 | 0.04 |
| Oil B+0.2% 2-t-butyl-4-(5-t-butyl-2-thenyl) phenol | 163 | 9 | 0.04 |
|  | 600 | 14 | 0.1 |
|  | 982 | 10 | 0.02 |
| Oil B+0.2% 2,4-bis (2-thenyl) phenol | 332 | 4.3 | 0.02 |
|  | 720 | 18 | 0.6 |
|  | 738 | 14 | 1.1 |
| Oil C | 162 | 19 | 1.0 |
|  | 312 | 62 | 3.9 |
| Oil C+0.2% p-(2-thenyl) phenol | 162 | 4 | 0.02 |
|  | 306 | 20 | .03 |
|  | 5,000 |  | less than 1.0 |
| Oil C+0.2% 2,4-bis (2-thenyl) phenol | 331 | 1.5 | 0.01 |
|  | 978 | 20 | 0.9 |

Although the new compounds may be added in a wide range of percentages to mineral oils, it has been found, as illustrated by the foregoing examples, that quantities ranging from 0.05% to 0.2% will usually stabilize mineral oils satisfactorily against oxidation and deterioration. In some instances, however, it may be found desirable to add amounts up to 1% for this purpose.

There is nothing to prevent the preparation of compounds of the new series having alkyl side chains of any length. Solubility of these compounds in mineral oils improves, generally, with length of alkyl side chains. Alkyl groups of any length are satisfactory, although it is probable that when the alkyl side chains are excessively long, less effect per weight of material may be encountered since the alkyl side chains themselves are probably inert. For this reason, in oil compositions, it is preferred to use compounds of the new series in which no alkyl side chain is of any greater length than those which may be derived from petroleum wax, and, preferably, to use compounds in which no alkyl side chain is of no more than about six carbon atoms in length.

It is contemplated by this invention that the new reaction products of haloalkyl thiophenes and hydroxyaryl compounds will be incorporated in lubricating oil compositions in amounts sufficient to improve the characteristics thereof. The basic materials to which these improving agents are to be added may be generally described as mineral lubricating oils of the type normally used in internal combustion engines. Such oils are generally produced from petroleum, but may be produced synthetically or derived from other sources. It is contemplated that the principles of this invention may be applied to lighter petroleum products such as gasoline and kerosene, or to heavier petroleum products of the nature of petroleum gear lubricants, petrolatum jellies and petroleum waxes. Other addition agents may be present in the composition for the purpose of improving the composition in other or in the same respects as the compositions are improved by the addition of the products of this invention.

This invention also contemplates the preparation and marketing of the reaction products of this invention alone, or in the form of oil concentrates, that is, mixtures of the reaction products of this invention with oil, in which the reaction products are present in quantities in excess of that required to improve the characteristics of the oil, so that the concentrates may be mixed with a larger quantity of oil to improve its characteristics. In such concentrates, the reaction products may be present in concentrations ranging as high as 50%, and any other desired addition agents may also be present.

What is claimed is:

1. A composition of matter having the formula:

A—B wherein A is a radical selected from the group consisting of 2-thenyl and an alkyl-substituted 2-thenyl in which the alkyl substituent is less than about 6 carbon atoms in length, and B is a radical selected from the group consisting of hydroxy-phenyl, hydroxy-naphthyl, an alkyl-substituted hydroxy-phenyl and an alkyl-substituted hydroxy-naphthyl, in which the alkyl substituents are less than about 6 carbon atoms in length.

2. A composition of matter having the formula:

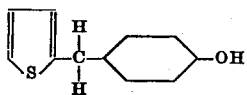

3. A composition of matter having the formula:

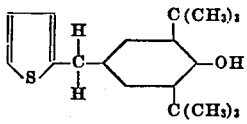

4. A composition of matter having the formula:

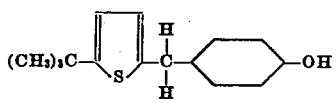

5. A composition of matter having the formula:

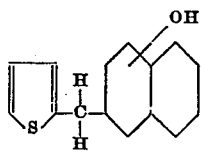

6. A composition of matter having the formula:

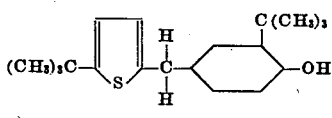

7. A mineral oil containing a minor proportion, sufficient to stabilize the oil against discoloration and oxidation, of a composition of matter having the formula:

A—B wherein A is a radical selected from the group consisting of 2-thenyl and an alkyl-substituted 2-thenyl in which the alkyl substituent is less than about 6 carbon atoms in length, and B is a radical selected from the group consisting of hydroxy-phenyl, hydroxy-naphthyl, an alkyl-substituted hydroxy-phenyl and an alkyl-substituted hydroxy-naphthyl, in which the alkyl substituents are less than about 6 carbon atoms in length.

8. A mineral oil containing from about 0.05% and up to about 1% of a composition of matter having the formula:

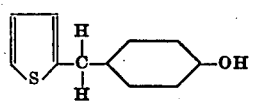

9. A mineral oil containing from about 0.05% and up to about 1% of a composition of matter having the formula:

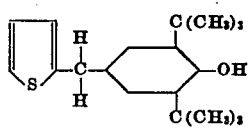

10. A mineral oil containing from about 0.05% and up to about 1% of a composition of matter having the formula:

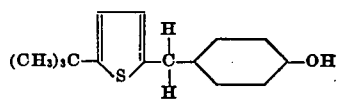

11. A mineral oil containing from about 0.05% and up to about 1% of a composition of matter having the formula:

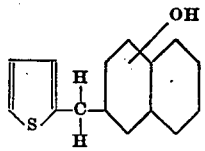

12. A mineral oil containing from about 0.05% and up to about 1% of a composition of matter having the formula:

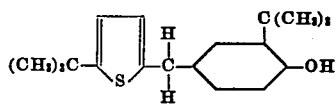

JOHN H. McCRACKEN.

REFERENCES CITED

The following references are of record in the file of this patent:

UNITED STATES PATENTS

| Number | Name | Date |
|---|---|---|
| 1,946,430 | Thauss | Feb. 6, 1934 |
| 2,101,560 | Ralston | Dec. 7, 1937 |
| 2,157,796 | Muth | May 9, 1939 |
| 2,160,293 | Shoemaker | May 30, 1939 |
| 2,184,040 | Garner | Dec. 19, 1939 |

OTHER REFERENCES

Richter: "Organic Chemistry," Wiley, 1938, pages 649–650.

Caesar and Sachanen: "Ind. Eng. Chem.," 40, 922 (1948).